United States Patent
Hughes et al.

(10) Patent No.: US 6,530,038 B1
(45) Date of Patent: Mar. 4, 2003

(54) STREAMLINED INITIALIZATION AND REFRESH OF FILE SYSTEM DIRECTORY LIMITS

(75) Inventors: Sarah Blodgett Hughes, Round Rock, TX (US); David John Kleikamp, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/399,236

(22) Filed: Sep. 16, 1999

(51) Int. Cl.[7] .............................................. G11C 29/00
(52) U.S. Cl. ......................... 714/15; 709/212; 709/213
(58) Field of Search ........................... 714/15; 707/202, 707/204; 709/212, 213, 229; 711/154, 156

(56) References Cited

U.S. PATENT DOCUMENTS

| | | |
|---|---|---|
| 5,265,245 A | 11/1993 | Nordstrom et al. |
| 5,371,885 A | 12/1994 | Letwin |
| 5,684,986 A | 11/1997 | Moertl et al. |
| 5,765,151 A * | 6/1998 | Senator ....................... 707/202 |
| 5,781,906 A | 7/1998 | Aggarwal et al. |
| 5,822,562 A | 10/1998 | Dahlen et al. |
| 5,873,118 A | 2/1999 | Letwin |
| 5,875,444 A * | 2/1999 | Hughes .......................... 707/1 |

OTHER PUBLICATIONS

McKusick, Marshall Kirk, T.J. Kowalski. "Fsck—The UNIX File System Check Program." 4.2BSD, Computer Systems Research Group, UC Berkeley, 1985.*

McKusick, Marshall K., William N. Joy, Samuel J. Leffler, and Robert S. Fabry."A Fast File System for UNIX." ACM Transaction on Computer Systems, vol. 2, No. 3, Aug. 1984:181–197.*

"Solaris 2.6 System Administrator Collection vol. 1.—System Administration Guide." Sun Microsystems, 1997. <http://docs.sun.com/ab2/coll.47.4/SYSADMIN/@Ab2TocView?Ab2Lang=C&Ab2Enc=iso–8859–1>.*

"Introducing the New DIRLIMIT Utility". http://docs.hp-.com/cgi–bin/doc3k/B3021690178.13563/25 "Migrating to OS/2 Warp Server for e–business"http://www–900.ibm.com/cn/support/library/sw/download/sg245135.pdf.*

* cited by examiner

*Primary Examiner*—Robert Beausoliel
*Assistant Examiner*—Yolanda L. Wilson
(74) *Attorney, Agent, or Firm*—Jeffrey S. LaBaw; Joseph R. Burwell; David H. Judson

(57) ABSTRACT

Directory limits in a file system are initialized or refreshed in a streamlined manner during file system maintenance. In particular, when a check and repair utility performs full check and repair processing on a file system volume, a determination is made regarding whether there is an outstanding request to either prime or refresh the volume. In addition, if directory limits are currently enabled for the file system volume, an implied refresh request is noted. In either case, the request is satisfied in parallel with the check and repair processing. If no volume check and repair is necessary, then mount processing primes or refreshes the volume in a conventional manner.

22 Claims, 7 Drawing Sheets

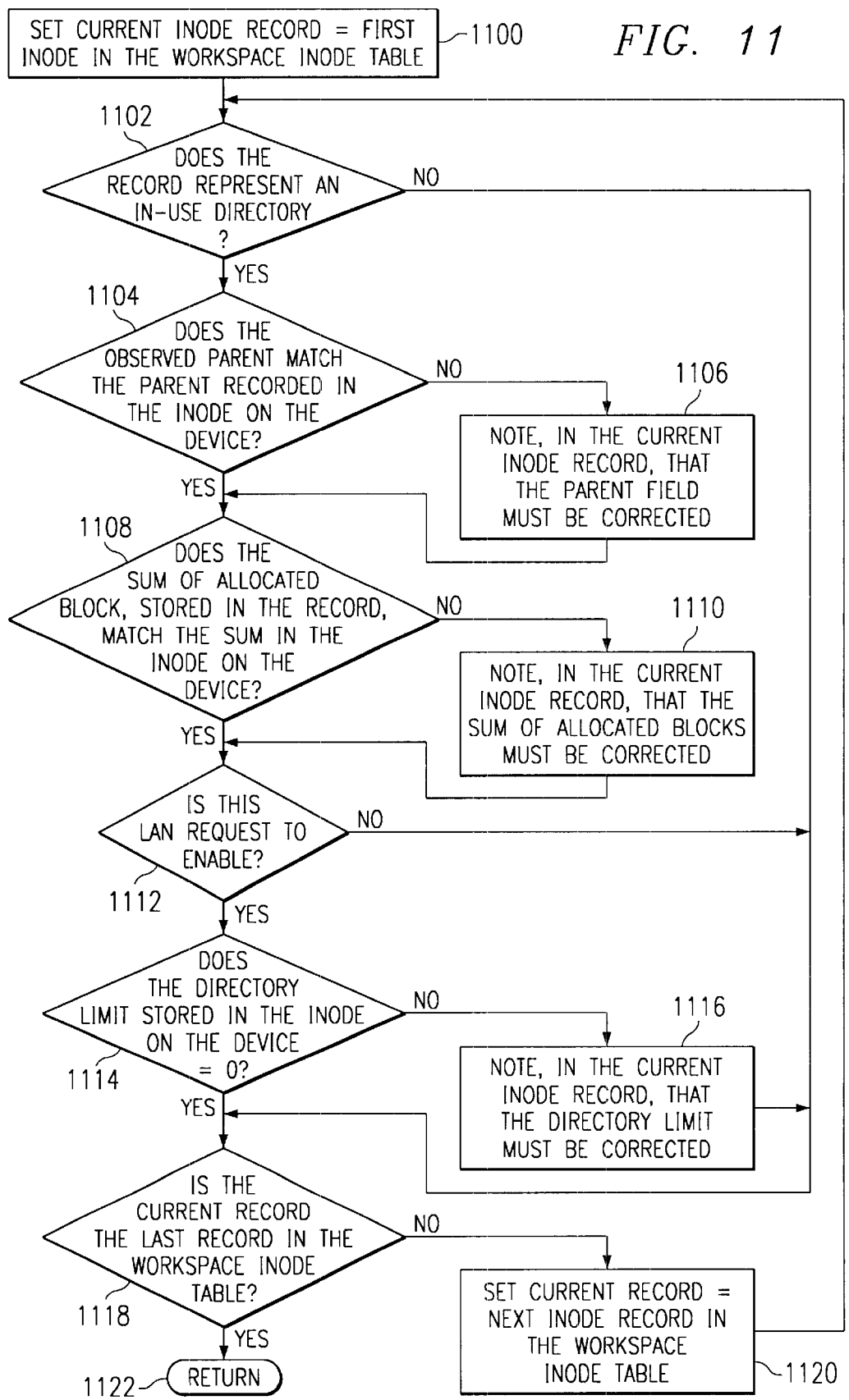

STREAMLINED INITIALIZATION AND REFRESH OF FILE SYSTEM DIRECTORY LIMITS

BACKGROUND OF THE INVENTION

1. Technical Field

The present invention relates generally to file system maintenance in a computer and more particularly to a technique for priming or refreshing directory limits in a file system.

2. Brief Description of the Related Art

Computer systems typically include mass storage devices configured as a "file system." Mass storage devices include hard drives, optical disk drives, magnetic tape drives, solid state disk drives and bubble memories. Software routines for maintaining such a file system are known in the art as "check and repair" utilities. For example, in the UNIX Operating System, a utility called "fsck" is used to verify control information and the directories of the file system after an unscheduled event such as a power outage. The "fsck" command bypasses standard file access methods and compares directory and control information in an effort to identify any disk blocks or control structures (known as inodes) that are not accounted for within the file system. Errors in the state of the file system are then addressed in an attempt to return the system to a known correct state. A similar routine, called "chkdsk" is used in DOS-based systems.

A local area network (LAN) system administrator typically imposes so-called "directory limits" on a file system. A directory limit is the maximum amount of space on the file system that can be allocated to the subdirectories and files of a given directory. Although directory limits are a LAN function, file system support is required to implement them. When directory (e.g., DASD) limits are enabled on a file system volume, it is necessary to "prime" the file system on the volume by initializing the limit on each directory to zero and by calculating a current "DASD Used" value for each directory. In addition, the system administrator may request that DASD Used data be refreshed at any time, and this also requires the calculation of current DASD Used for each directory.

In the case or initialization or priming, the calculation of DASD Used is a time-consuming, input-output intensive process. It involves recursively summing the file system storage used by each file or subdirectory in each directory on the volume. In particular, it is necessary to store, in the structure for each directory, the sum of the storage allocated for each file in that directory. It is then necessary to add, from the bottom up, the sum stored for each directory to the sum stored for the directory which contains it, until the root directory contains the sum of all storage allocated to any file or directory on the volume. This processing requires the structure representing each file to be read at least once and the structure representing each directory to be read and written at least once.

In the prior art, the directory limits calculations are performed during the volume mount initiated when the request is received. However, if the file system residing on the volume was not properly shut down, or if some corruption has been detected by the file system, then it is also necessary to check and repair the file system before the volume can be mounted. A full check and repair, however, is itself a time-consuming, I/O intensive process that consumes processing time but which is unavoidable for a file system in the situations described.

It would be desirable to streamline the priming or refreshing of directory limits in a file system.

BRIEF SUMMARY OF THE INVENTION

The present invention addresses the deficiencies of the prior art by enabling the initialization or refresh of the file system directory limits in parallel to the check and repair operation during a file system mount.

According to the present invention, when the check and repair utility performs full check and repair processing on a file system a determination is made regarding whether directory limits are currently enabled for the volume and whether there is an outstanding request to either prime or refresh directory limits for the volume. If there is an outstanding request, it is satisfied in parallel with the check and repair processing. If there is no outstanding request but directory limits are currently enabled for the volume, then processing is done as though there had been an outstanding request to refresh directory limits for the volume.

If no volume check and repair is necessary, then mount processing primes or refreshes directory limits for the volume in the usual manner.

Preferably, the check and repair routine calculates the storage used by each directory subtree as follows. First, when the check and repair utility verifies the amount of storage allocated to each file and directory in the file system, the utility notes, in dynamic storage, the amount of storage allocated. Then, the storage for each valid file is added to the sum for the directory that contains the file. The check and repair utility then verifies the validity of the directory tree. During verification, the utility determines and notes the distance from each directory's level in the tree to the root of the directory. The utility then adds, from highest level number to lowest, the sum of storage allocated to each directory to the sum for the directory that contains it.

When the structure for each directory is read (e.g., to verify its back pointer), the check and repair utility stores the sum it has calculated for the structure as DASD Used and stores zero as the Directory Limit (for the directory) if the requested service is "prime." After any other check and repair processing needed for the directory, the structure is written to the volume.

If refresh processing is being performed, the utility determines whether DASD Used currently stored in the structure matches the sum that the utility has calculated for it when the structure for each directory is read. If these values do not match, the check and repair utility replaces the current value with the sum calculated and forces a write to the volume.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 11 is a flowchart that illustrates how the check and repair utility verifies given information for each directory.

DETAILED DESCRIPTION OF THE PREFERRED EMBODIMENT

Figure 1:
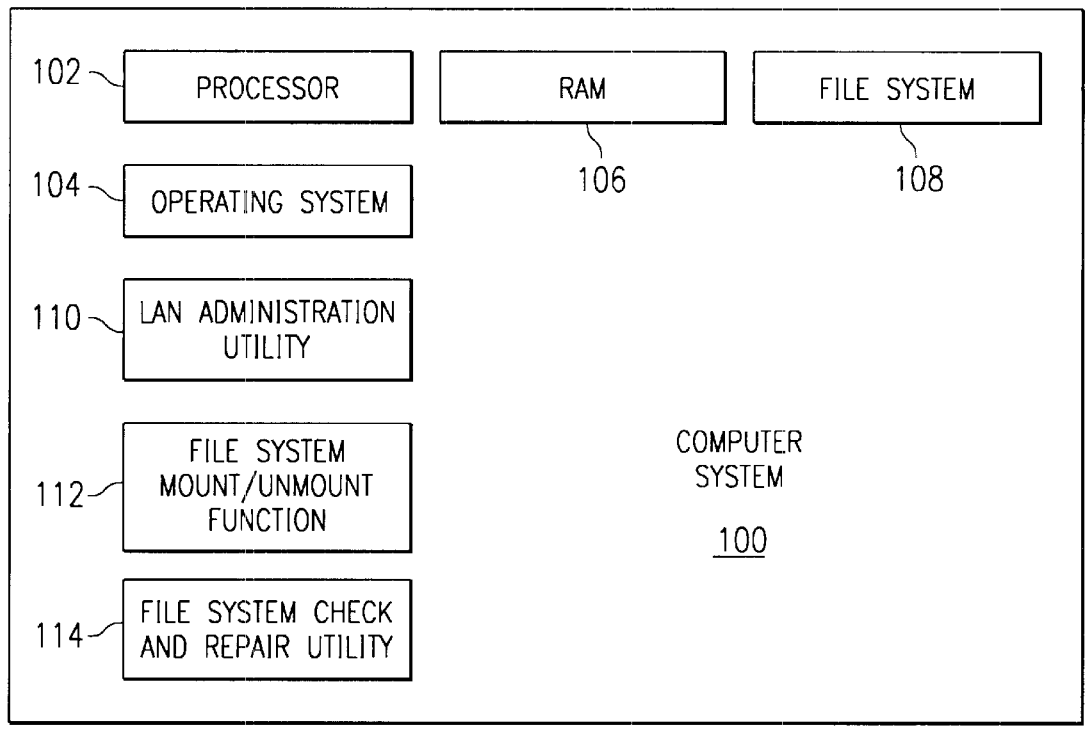
FIG. 1 illustrates a computer system in which the present invention is implemented.

FIG. 1 illustrates a computer or computer system 100 that includes a processor 102, an operating system 104, system memory 106, a file system 108, and various applications. The file system 108 may be one of any of a number of known configurations, and the present invention should not be construed as limited for use in any particular system configuration. One such configuration is defined by a root directory tree and a set of organizing data structures including data blocks, bit maps and so-called "inodes." An "inode" is a control structure (in a Unix-based file system) that represents a file, directory or link in the file system. In other file system configurations, this construct is sometimes referred to as a "fnode", "onode", "vnode" or the like. The term "inode" is used herein for exemplary purposes and should not be taken to limit the particular type of file system configuration in which the invention is implemented.

The applications include a local area network (LAN) administration utility 110, a file system mount/unmount utility 112, and a file system check and repair utility 114. The LAN administration utility is used by a system administrator to request a directory limit initialization or refresh operation. This request may be configured via a command line or graphical user interface in a known manner. The file system mount/unmount utility 112 is used to mount or unmount a given volume of the file system. A volume is a collection of partitions, with each partition representing a part or whole of a physical disk.

The check and repair utility 114 provides a method of checking and repairing the file system 108 upon a predetermined occurrence, such as a power outage from a system panic or crash, system boot-up, routine file system maintenance, or the like. If errors in the state of the file system are located, the utility attempts to fix them, if possible, to prevent further system anomalies when users begin using the system.

In accordance with the present invention, the conventional check and repair utility is augmented to facilitate initialization or refresh of directory limits in parallel with the check and repair operation. This functionality may be built into the check and repair utility itself or be an adjunct to an existing utility.

Figure 2:
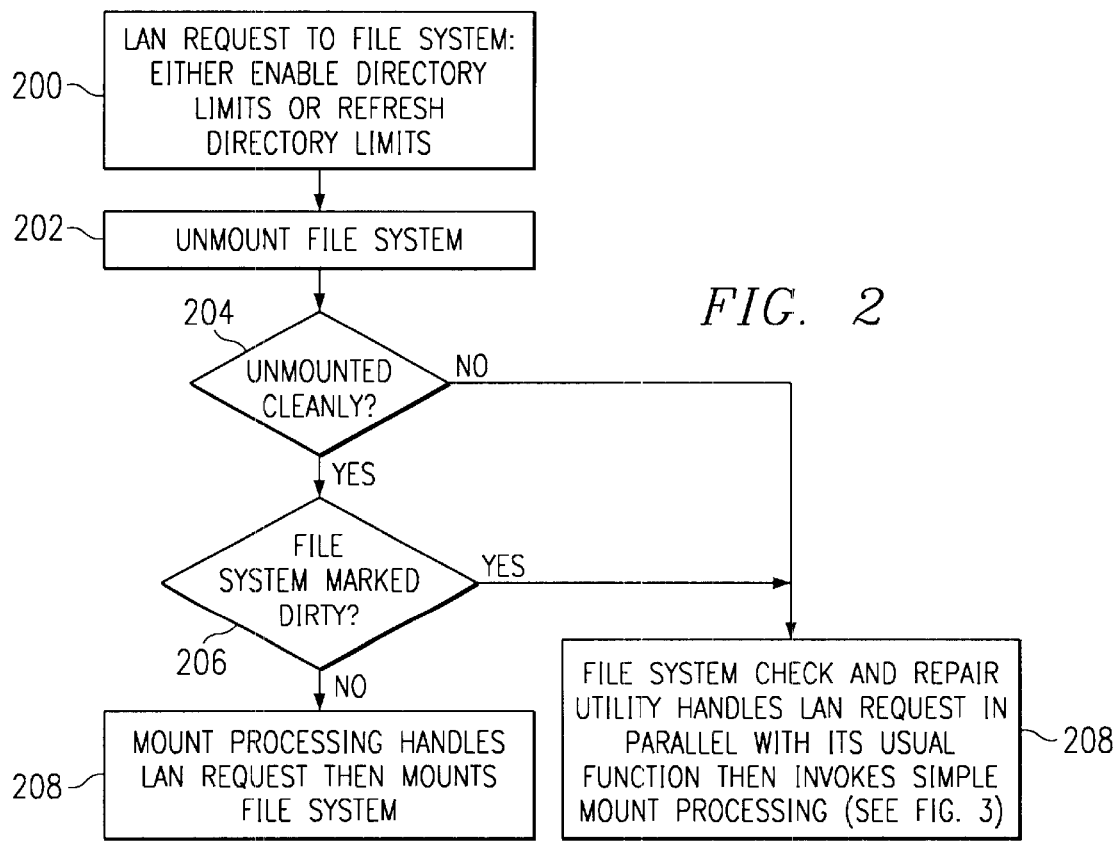
FIG. 2 is a flowchart of the basic operation of the present invention.

FIG. 2 illustrates the basic operation of the present invention. The routine begins at step 200 with a LAN request to the file system 108 to Enable (i.e., prime or initialize) Directory Limits or Refresh Directory Limits. The LAN request is issued, as noted above, from the LAN administration utility 110 via a system administrator command line or graphical user interface. As is known in the art, this request generates appropriate commands at step 202 to unmount the file system 108. As used herein, the request may unmount a given volume of the file system, or the entire file system. At step 204, a test is performed to determine whether the file system volume unmounted cleanly, i.e., without error. If so, the routine continues at step 206 to test whether the file system has been marked as corrupted. If the output of the test at step 206 indicates that the file system is not corrupted, the routine continues at step 208. In particular, the mount processing handles the LAN request and then mounts the file system in the usual way. If, however, the output of the test at step 204 is negative, or following a positive outcome of the test at step 206, the routine advances to step 208. At this step, and in accordance with the present invention, the file system check and repair utility handles the LAN request in parallel with its usual function. Upon completion, the file system check and repair utility signals the mount/unmount utility 112 to invoke simple mount processing in the usual manner.

Figures 3, 3A:
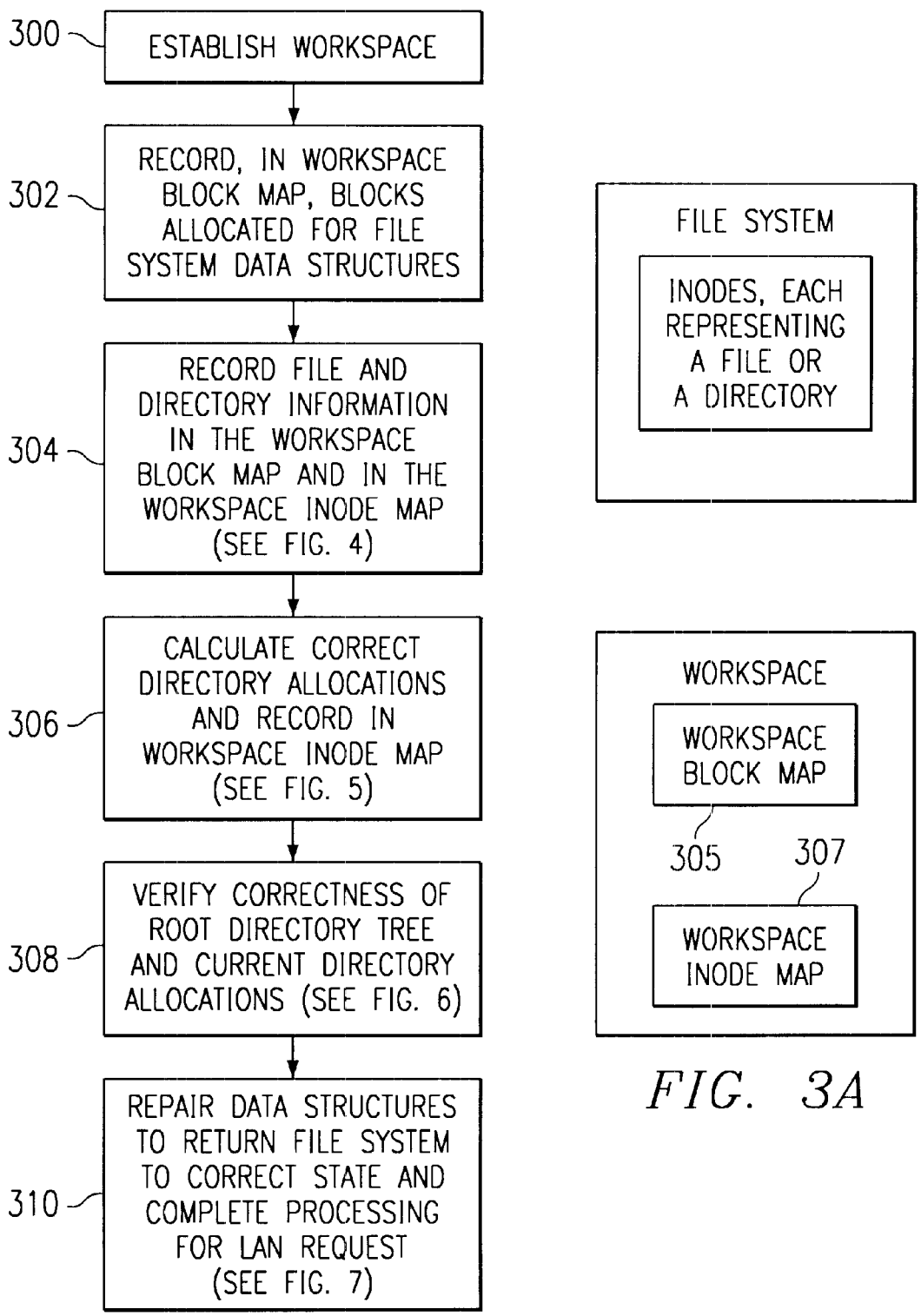
FIG. 3 is a flowchart illustrates the operation of the file system check and repair utility in more detail.
FIG. 3A is a simplified block diagram of the workspace block map and the workspace inode map that are used by the inventive check and repair utility.

FIG. 3 illustrates the operation of the file system check and repair utility in more detail. The routine begins at step 300 by establishing a workspace. The workspace, which is illustrated in FIG. 3A, includes a workspace block map 305 and a workspace inode map 307. A map is sometimes referred to herein as a table. The workspace inode table and workspace block map are logical objects in the file system. They need not reside in contiguous storage and need not be in any particular order. The workspace inode map identifies the status of each inode in the file system (i.e. whether the inode is available or whether it represents a file, a directory or a link), and the workspace block map identifies the status of all blocks in the volume (i.e. whether available or in use). The workspace inode map is used to verify the correctness of the root directory tree and the connectedness of all in-use inodes. The root directory tree is "correct" if all forward and backward pointers are correct and internally consistent. A more detailed description of the workspace maps is provided in U.S. Pat. No. 5,875,444, issued Feb. 23, 1999, which patent is incorporated herein by reference.

Figures 4, 6:
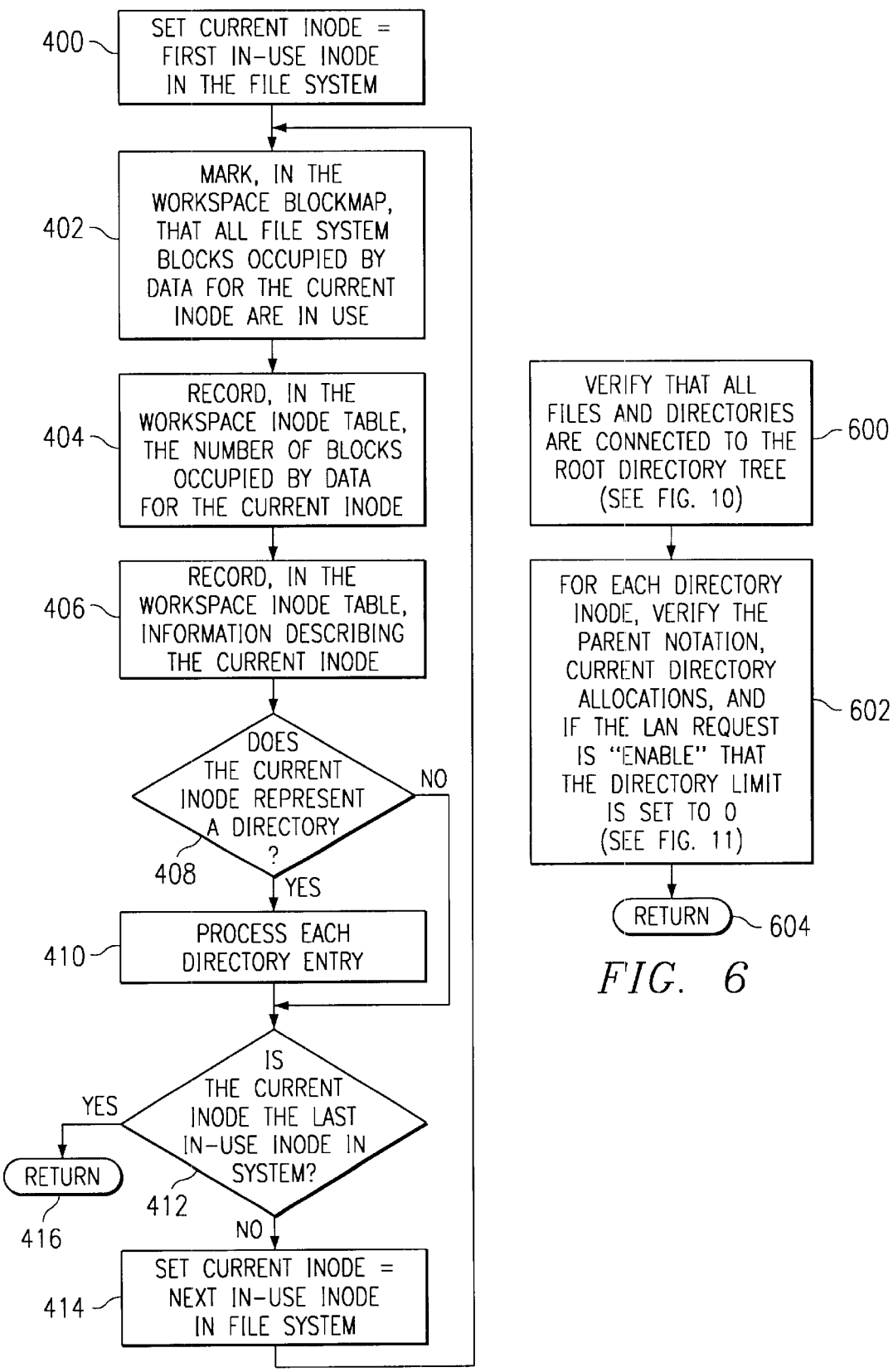
FIG. 4 is a flowchart illustrating how the file check and repair utility records file and directory information in the workspace block map and in the workspace inode map.
FIG. 6 is a flowchart that illustrates how the check and repair utility verifies the correctness of the root directory tree and the current directory allocations.

Returning now back to FIG. 3, the routine continues at step 302. In this step the utility records, in the workspace block map, blocks that have been allocated for the file system data structures. At step 304, the utility records file and directory information in the workspace block map and in the workspace inode map. Step 304 is described in more detail in FIG. 4. The utility then continues at step 306. At this step, the utility calculates current directory allocations and records such allocations in the workspace inode map. This step is described in more detail in the flowchart of FIG. 5. The check and repair utility then continues at step 308 to verify the correctness of the root directory tree and the current directory allocations. Step 308 is described in more detail in the flowchart of FIG. 6. At step 310, the file check and repair utility repairs data structures as necessary to return the file system to its correct state and completes the processing for the LAN request. Step 310 is illustrated in more detail in the flowchart of FIG. 7.

As noted above, FIG. 4 illustrates how the file check and repair utility records file and directory information in the workspace block map and in the workspace inode map. The routine begins at step 400 by setting the current inode equal to the first in-use inode in the file system. The routine then continues at step 402. At this step, the routine marks, in the workspace block map 305, that all file system blocks occupied by data for the current inode are in use. At step 404, the routine records, in the workspace inode table, the number of blocks occupied by data for the current inode. The routine then continues at step 406 to record, in the workspace inode table, information describing the current inode. At step 408, a test is performed to determine if the current inode represents a directory. If so, the routine continues at step 410 to process each directory entry. Thereafter, or if the result of the test at step 408 is negative, the routine continues at step 412 to test whether the current inode is the last in-use inode in the system. If the outcome of the test at step 412 is negative, the routine continues at step 414 to set the current inode equal to the next in-use inode in the file system. Control then returns to step 402. If, however, the outcome of the test at step 412 is positive, the routine returns at step 416 to complete the processing.

Figure 5:
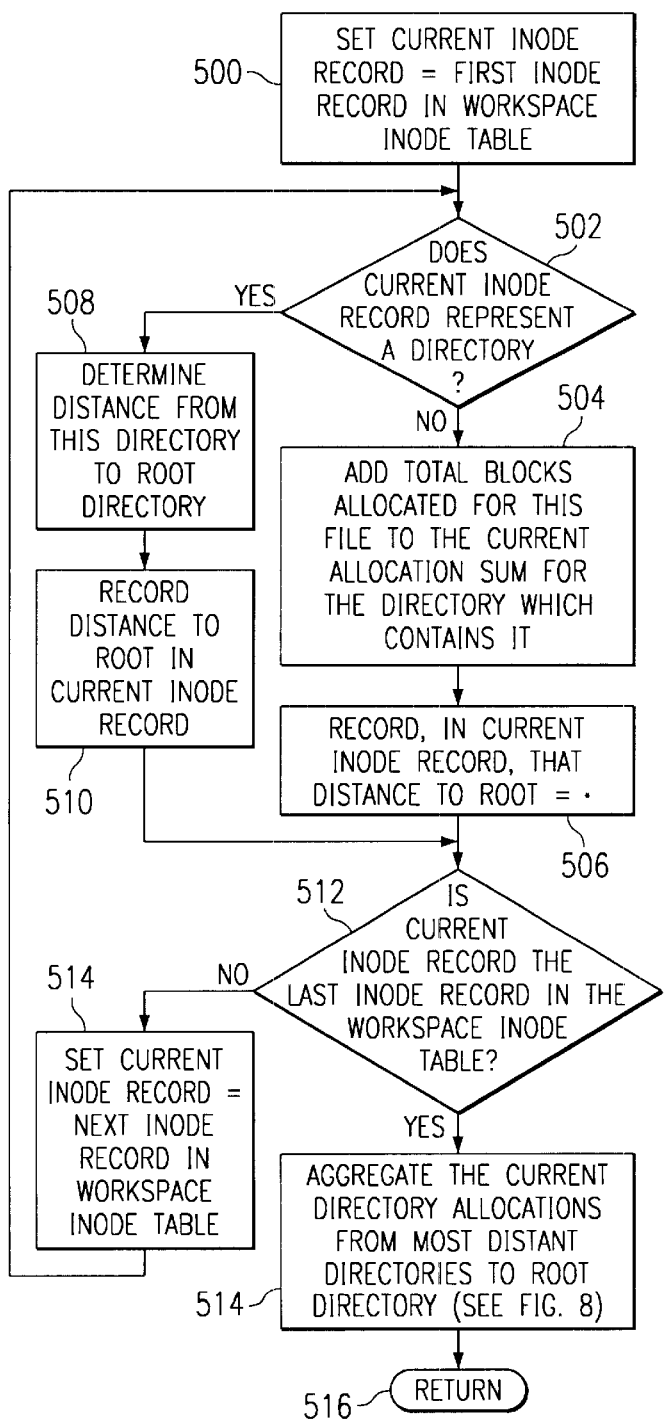
FIG. 5 is a flowchart that illustrates how the check and repair utility calculates current directory allocations and records such allocations in the workspace inode map.

FIG. 5 illustrates how the check and repair utility calculates current directory allocations and records such allocations in the workspace inode map 307. The routine begins at step 500 by setting the current inode record equal to the first inode record in the workspace inode table. A test is then performed at step 502 to determine if the current inode record represents a directory. If not, control then branches to step 504 to add the total blocks allocated for this file to a current allocation sum for the directory which contains the file. Control then continues at step 506 by having the routine record, in the current inode record, that the distance to the root directory equals −1. If the outcome of the test at step 502 is positive, the routine continues at step 508 instead of branching. At step 508, the routine determines the distance from this directory to the root directory. Thereafter, at step 510, the routine records, in the current inode record, the distance to the root directory. Control then continues at step 512, which is also reached following step 506.

Figure 8:
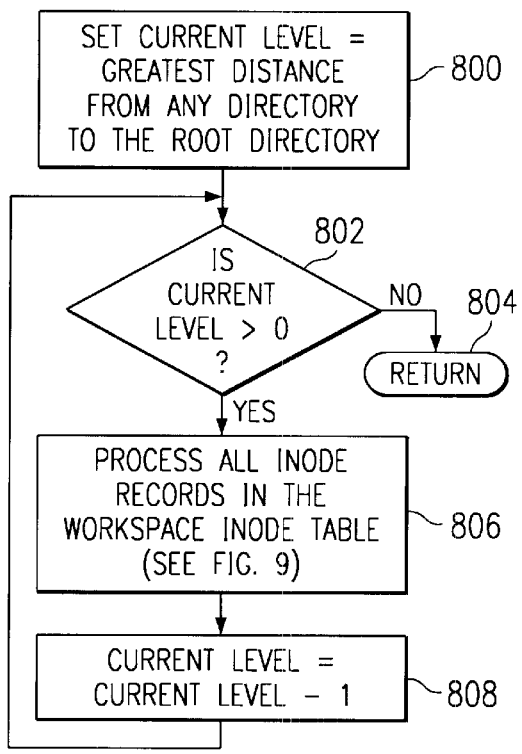
FIG. 8 is a flowchart that illustrates how the utility aggregates current directory allocations from the most distant directories to the root directory.

At step 512, a test is performed to determine whether the current inode record is the last inode record in the workspace inode table. If not, the routine branches to step 514 to set the current inode record equal to the next inode record in the workspace inode table. Control then returns to step 502. If, however, outcome of the test at step 512 is positive, the routine continues at step 514 to aggregate the current directory allocations from the most distant directories to the root directory. Step 514 is described in more detail in FIG. 8 below. Control then returns at step 516 to complete the processing.

As noted above, FIG. 6 describes how the check and repair utility verifies the correctness of the root directory tree and the current directory allocations. The routine begins at step 600 to verify that all files and directories are connected to the root directory tree. This operation is described in more detail in FIG. 10. The routine then continues at step 602. At this step, for each directory, the routine verifies the parent notation, current directory allocations and, if the LAN request is "Enable," whether that directory limit is set to a non-zero value. Step 602 is described in more detail in the flowchart of FIG. 11. Following step 602, control then returns at step 604 to complete the processing.

Figure 7:
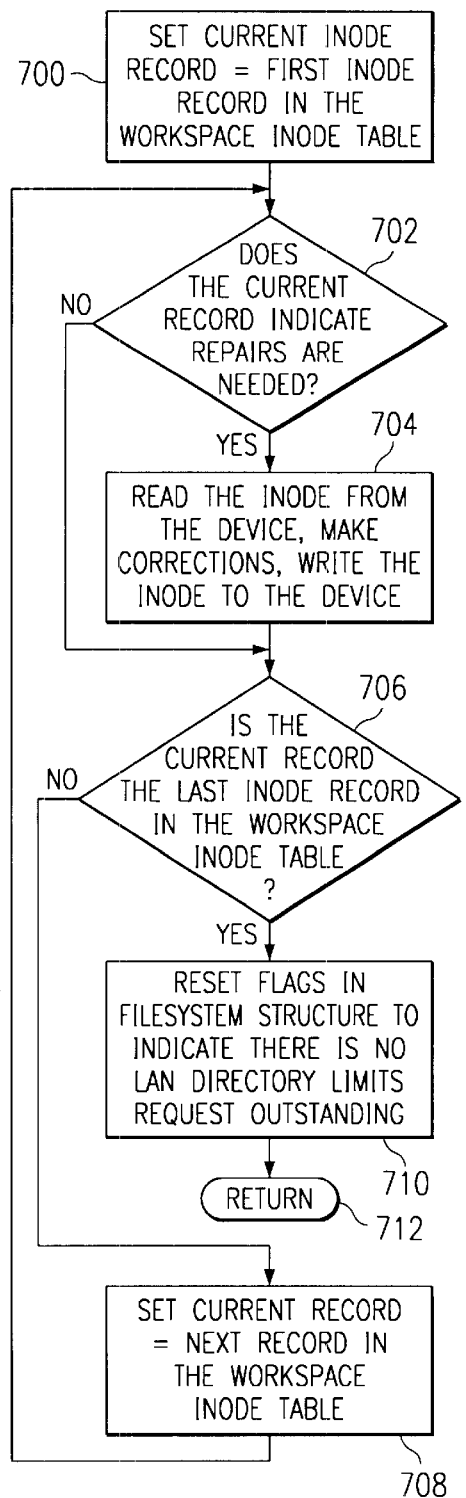
FIG. 7 is a flowchart that illustrates how the file check and repair utility repairs data structures as necessary to return the file system to its correct state and then completes the processing of a LAN request.

FIG. 7 illustrates how the file check and repair utility repairs data structures as necessary to return the file system to its correct state and completes the processing for the LAN request. The routine begins at step 700 to set the current inode record equal to the first inode record in the workspace inode table. A test is then performed at step 702 to determine if the current record indicates that repairs are needed. If so, the routine continues at step 704 to read the inode from the physical device, make necessary corrections, and then write the inode back to the device. The routine then continues at step 706, which is also reached by a negative outcome of the test at step 702. At step 706, the routine tests whether the current record is the last inode record in the workspace inode table. If not, the routine branches to step 708 to set the current record equal to a next record in the workspace inode table. Control then returns to step 702. If, however, the outcome of the test at step 706 is positive, the routine continues at step 710 to reset flags in the file system data structures to indicate there is no LAN Directory Limits request outstanding. Control then returns at step 712 to complete the processing.

As noted above, FIG. 8 illustrates how to aggregate the current directory allocations from the most distant directories to the root directory. This was step 514 in FIG. 5. The routine begins at step 800 by setting a current level equal to a greatest distance from any directory to the root directory. A test is then performed at step 802 to determine whether the current level is greater than zero. If not, control branches to step 804 and returns to complete the processing. If the outcome of the test at step 802 is positive, the routine continues at step 806 to process all inode records in the workspace inode table. This operation is described in the flowchart of FIG. 9. Following step 806, the routine sets the current level equal to the current level minus 1. Control then returns to step 802.

Figure 9:
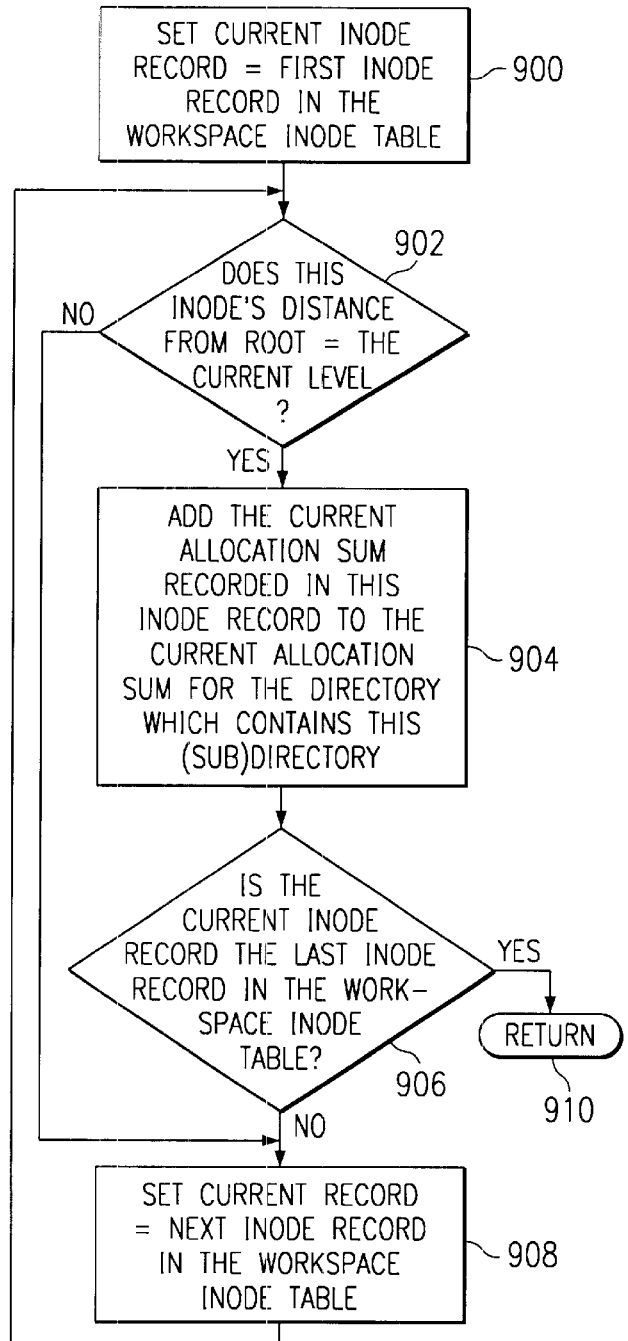
FIG. 9 is a flowchart that illustrates how the inode records are processed in the workspace inode map.

FIG. 9 illustrates how the inode records are processed in the workspace inode map table. This was step 806 in FIG. 8. The routine begins at step 900 to set the current inode record equal to a first inode record in the workspace inode table. A test is then performed at step 902 to determine whether this inode's distance from the root directory is equal to the current level. If so, the routine continues at step 904 to add the current allocation sum recorded in this inode record to a current allocation sum for the directory which contains this (sub)directory. Control then continues at step 906 to test whether the current inode record is the last inode record in the workspace inode table. If not, the routine then branches to step 908 to set the current record equal to a next record in the workspace inode table. Step 908 is also reached from a negative outcome of the test at step 902. Following the increment at step 908, control then returns to step 902. If the outcome of the test at step 906 is positive, the routine returns at step 910 to complete the processing.

Figure 10:
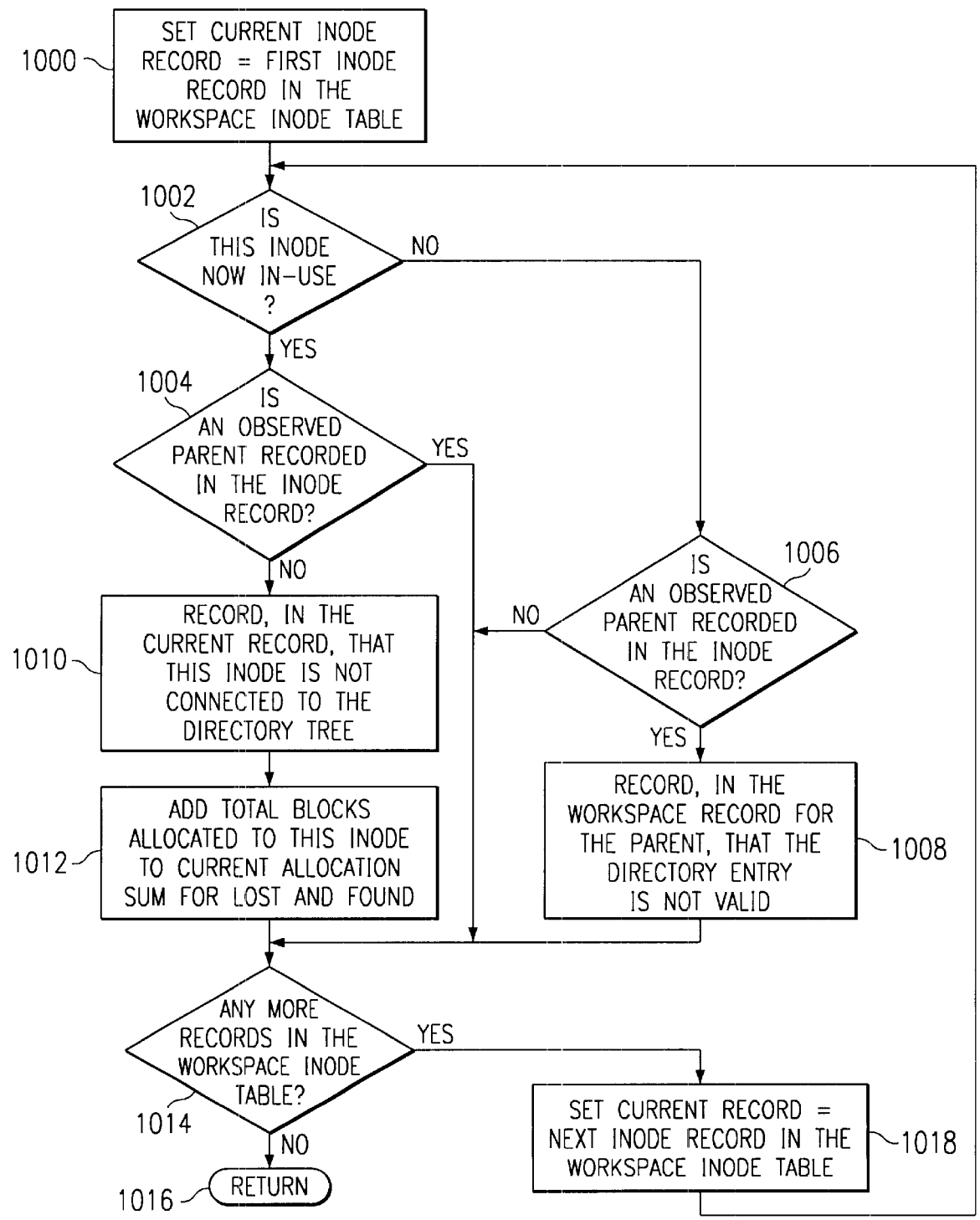
FIG. 10 is a flowchart that illustrates how the utility verifies that all files and directories are connected to the root directory tree.

FIG. 10 illustrates how to verify that all files and directories are connected to the root directory tree. This was step 600 in FIG. 6. The routine begins at step 1000 by setting the current inode record equal to the first inode record in the workspace inode table. A test is then performed at step 1002 to determine if this inode is now in use. If so, the routine continues at step 1004 to test whether an observed parent inode is recorded in the inode record. If the outcome of the test at step 1004 is positive, the routine continues at step 1014, which is described below.

If the outcome of the test at step 1002 is negative, however, control branches to step 1006 to test whether an observed parent inode is recorded in the inode record. If not, control continues at step 1014. If, however, the outcome of the test at step 1006 is positive, the routine continues at step 1008 to record, in the workspace record for the parent inode, that the directory entry is not valid. Following step 1008, control then continues at step 1014.

If the outcome of the test at step 1004 is negative, the routine branches to step 1010 to record, in the current record, that this inode is not connected to the directory tree. Control then continues at step 1012 to add the total blocks allocated to this inode to the current allocation sum for the directory to which they will be reconnected during the check and repair utility's repair processing. After step 1012, control then continues at step 1014.

At step 1014, a test is performed to determine if any more records are left to be processed in the workspace inode table. If not, the routine returns at step 1016 to complete the processing. If, however, the outcome of the test at step 1014 is positive, the routine sets the current record equal to the next inode record in the workspace inode table before returning to step 1002. This completes the processing.

FIG. 11 illustrates in detail how the routine verifies, for each directory, the parent notation, current directory allocations and, if the LAN request is "Enable," whether that directory limit is set to zero. This was step 602 in FIG. 6. The routine begins at step 1102 by setting the current inode record equal to a first inode in the workspace inode table. A test is then performed at step 1104 to determine if the record represents an inode directory. If not, the routine branches to step 1118, which is described below. If, however, the outcome of the test at step 1102 is positive, the routine continues a t step 1104 to test whether an observed parent inode matches the parent recorded in the inode on the physical device. If the outcome of the test at step 1104 is negative, the routine branches to step 1106 to make a notation in the current inode record that the parent field must be corrected. If the outcome of the test at step 1104 is positive, or following step 1106, the routine continues at step 1108 to test whether the sum of allocated blocks stored in the record matches the sum in the inode on the physical device. If the outcome of the test at step 1108 is negative, the routine branches to step 1110 to make a notation in the current inode record that the sum of allocated blocks must be corrected. If the outcome of the test at step 1108 is positive, or following step 1110, the routine continues at step 1112 to test whether this is a LAN request to Enable. If not, control branches to step 1118. If, however, the outcome of the test at step 1112 is positive, control continues at step 1114.

At step 1114, a test is performed to determine if the Directory Limit stored in the inode on the physical device is non-zero. If not, the routine branches to step 1116 to make a notation in the current inode record that the Directory Limit must be corrected. Control then continues at step 1118, which is also reached by a negative outcome of the test at step 1114. At step 1118, a test is made to determine whether the current record is the last record in the workspace inode table. If not, control branches to step 1120 to set the current record equal to a next record in the workspace inode table before returning to step 1102. Following a positive outcome of the test at step 1118, control returns at step 1122 to complete the processing.

The present invention thus enables the priming or refreshing of directory limits during full check and repair processing. This additional processing, however, does not impact performance. Indeed, during a full check and repair, the utility must verify the storage allocated to each file and directory, and it must visit each directory in the tree to verify the correctness of the tree structure. The time for this processing is not increased in any significant way by adding the calculation of current DASD Used for each directory in accordance with the present invention. In particular, although full check and repair processing does not normally write to each directory in the file system (as it must to prime or the volume for Directory limits), such processing does read the structure representing each directory. The present invention recognizes a significant processing efficiency by effecting the priming or refresh of the directory limits during the check and repair operation itself.

During initialization for full check and repair processing, the inventive routine determines whether directory limits are currently enabled for the file system and whether there is an outstanding request to "prime for directory limits" or to "refresh for directory limits." If directory limits are enabled for the file system, then processing is done as though there had been an explicit "refresh for directory limits" request. If there is an outstanding request (either implied or explicit), the inventive check and repair utility satisfies the request and then resets appropriate flags as necessary so that the processing will not be repeated during subsequent mount processing.

In the preferred embodiment, the check and repair routine calculates the directory limit used by each directory subtree as follows. First, when the check and repair utility verifies the amount of storage allocated to each file and directory in the file system, the utility notes, in dynamic storage, the amount of storage allocated. Then, the storage for each valid file is added to the sum for the directory that contains the file. The check and repair utility then verifies the validity of the directory tree. During verification, the utility determines and notes the distance from each directory's level in the tree to the root of the directory as well as the distance from each directory's level in the tree to the root of the directory tree. For example, a subdirectory "A" of the root would have distance 1, a subdirectory "B" of directory "A" would have distance 2, and so forth. The utility then adds, from highest level number to lowest, the sum of storage allocated to each directory to the directory that contains it. Thus, if there are n directory levels in the tree, then first the sum for each directory in level n is added to the sum for its parent directory in level n−1. Next, the sum for each directory in level n−1 is added to the sum for its parent directory in level n−2. Processing continues in this fashion until the sum for each directory in level 1 has been added to the sum for the single directory in level 0, the root.

If the requested service is "prime for directory limits," then, when the structure for each directory is read to verify its back pointer, the check and repair utility stores the sum calculated for it as DASD Used and stores zero as the Directory Limit. Then, after any other check and repair processing needed for the directory, the structure is written to the volume.

If the requested service is "refresh for Directory Limits," then, when the structure for each directory is read to verify its back pointer, the check and repair utility determines whether DASD Used now stored in the structure matches the sum that the utility has calculated for it. If these values do not match, the check and repair utility replaces the current value with the sum calculated and forces a write to the volume.

The present invention provides many advantages over the prior art. In particular, in those cases where a full check and repair of the file system is necessary, this invention eliminates at least one-half of the input/output normally required for priming a volume for directory limits. Moreover, there is even greater savings in the case of refreshing for directory limits because writes are only required for directories whose DASD Used sum is found to be incorrect. In addition, the present invention does not require additional input/output or processing to construct an in-memory representation of the file system directory tree, depending on how the recursive summing is implemented in mount processing.

One of the preferred implementations of the file check and repair utility of the invention is as a set of instructions in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or even downloaded via a computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred embodiment in a specific operating system environment, those skilled in the art will recognize that the invention can be practiced, with modification, in other and different operating system architectures with the spirit and scope of the appended claims. Thus, the use of the term "inode" should not be construed to limit the present invention to a Unix-based implementation. The invention is also useful in a DOS-based or other type of operating system. As used herein and in the claims below, "inode" should thus be construed as a shorthand for any equivalent type of file system control structure such as "fnode" (in the DOS-based implementation).

Also, the inventive utility may be implemented in a file system having its own processor.

Having thus described my invention, what I claim as new and desire to secure by Letters Patent is set forth in the following claims:

1. A method of managing a file system, comprising the steps of:
    unmounting the file system;
    during a check and repair operation on the file system, determining whether there is an outstanding request to either prime or refresh directory limits of the file system, wherein a directory limit is a maximum amount of space on the file system that can be allocated to a given directory; and
    if so, servicing the outstanding request as the check and repair operation is being carried out; and
    following completion of the check and repair operation, mounting the file system.

2. The method as described in claim 1 further including the steps of:
    determining whether the file system unmounted without error; and
    if not, initiating the check and repair operation.

3. The method as described in claim 1 wherein the step of servicing the outstanding request comprises the steps of:
    determining whether the outstanding request is a request for priming the directory limits; and
    if so, initializing the directory limits for each directory.

4. The method as described in claim 3 wherein the step of initializing the directory limits for each directory includes the steps of:
    storing a given sum as a directory limit used; and
    storing zero as a directory limit.

5. The method as described in claim 1 wherein the step of servicing the outstanding request comprises the steps of:
    determining whether the outstanding request is a request for refreshing the directory limits; and
    if so, refreshing the directory limits for each directory.

6. The method as described in claim 5 wherein the step of refreshing the directory limits for each directory comprises:
    determining whether a directory limit used value matches a given sum calculated for the directory; and
    if not, replacing the directory limit used value with the given sum calculated for the directory.

7. The method as described in claim 1 wherein the file system is defined by a root directory tree and a set of organizing data structures including inodes and data blocks.

8. The method as described in claim 7 wherein the step of servicing the outstanding request calculates a directory limit used by each directory.

9. The method as described in claim 8 wherein the directory limit used by each directory is calculated by:
    adding to a given sum the amount of storage allocated for each file in the directory;
        determining a distance from each level in the directory to a root of the directory tree; and
        adding, from a highest level to a lowest level, a sum of storage allocated to each directory to the sum of storage allocated to a parent directory level.

10. A method of checking and repairing a file system upon a predetermined occurrence, the file system defined by a root directory tree and a set of organizing data structures includes inodes and data blocks, comprising the steps of:
    reserving a workspace in the file system for file system check and repair;
    examining the organizing data structures to determine and store in the workspace information reflecting a current state of the file system;
    using the information to verify the correctness of the root directory tree;
    determining whether there is an outstanding request to either prime or refresh directory limits of the file system;
    if so, servicing the outstanding request.

11. The method as described in claim 10 further including the step of:
    repairing any organizing data structures to return the file system to a known correct state.

12. The method as described in claim 10 wherein the information includes an inode map that identifies a status of each inode in the file system and a block map that identifies all data blocks in use.

13. The method as described in claim 10 wherein the step of servicing the outstanding request comprises the steps of:
    determining whether the outstanding request is a request for priming the directory limits; and
    if so, initializing the directory limits for each directory.

14. The method as described in claim 13 wherein the step of initializing the directory limits for each directory includes the steps of:
    storing a given sum as a directory limit used; and
    storing zero as a directory limit.

15. The method as described in claim 10 wherein the step of servicing the outstanding request comprises the steps of:

determining whether the outstanding request is a request for refreshing the directory limits; and if so, refreshing the directory limits for each directory.

16. The method as described in claim 15 wherein the step of refreshing the directory limits for each directory comprises:

determining whether a directory limit used value matches a given sum calculated for the directory; and if not, replacing the directory limit used value with the given sum calculated for the directory.

17. A computer program product in a computer-useable medium for use in a computer having a file system, comprising:

means operative during a file system check and repair for determining whether there is an outstanding request to either prime or refresh directory limits of the file system, wherein a directory limit is a maximum amount of space on the file system that can be allocated to a given directory; and means responsive to the determining means for servicing the outstanding request.

18. The computer program product as described in claim 17 wherein the means for servicing the outstanding request includes means for calculating a directory limit used by each directory.

19. The computer program product as described in claim 18 wherein the means for calculating comprises:

means for adding to a given sum an amount of storage allocated for each file in the directory;

means for determining a distance from each level in the directory to a root of the directory tree; and means for adding, from a highest level to a lowest level, a sum of storage allocated to each directory to the sum of storage allocated to a parent directory level.

20. A computer system, comprising:

a processor;

an operating system;

a file system;

a file system check and repair utility, comprising:

means operative during a file system check and repair for determining whether there is an outstanding request to either prime or refresh directory limits of the file system, wherein a directory limit is a maximum amount of space on the file system that can be allocated to a given directory; and means responsive to the determining means for servicing the outstanding request during the file system check and repair.

21. A computer file system having a root directory tree and a set of organizing data structures including a control structure, comprising:

means for reserving a workspace in the file system to facilitate file system check and repair;

means for examining the organizing data structures to determine and store in the workspace information reflecting a current state of the file system;

means for using the information to verify correctness of a root directory tree of the file system; means for determining whether there is an outstanding request to either prime or refresh directory limits of the file system;

means responsive to the determining means for servicing the outstanding request; and means for repairing any organizing data structures to return the file system to a known correct state.

22. The computer file system as described in claim 21 wherein the control structure is an inode representing a file, directory or link in the file system.

\* \* \* \* \*